United States Patent [19]

Sane

[11] Patent Number: 4,693,989
[45] Date of Patent: Sep. 15, 1987

[54] PREPARATION AND SINTERING OF REFRACTORY METAL BORIDES, CARBIDES AND NITRIDES OF HIGH PURITY

[75] Inventor: Ajit Y. Sane, Willoughby, Ohio

[73] Assignee: Eltech Systems Corporation, Boca Raton, Fla.

[21] Appl. No.: 737,930

[22] Filed: May 29, 1985

Related U.S. Application Data

[63] Continuation-in-part of Ser. No. 625,599, Jun. 28, 1984, abandoned.

[51] Int. Cl.$^4$ .............................................. C04B 35/58
[52] U.S. Cl. ........................................ 501/96; 501/93; 501/87; 264/65; 75/238; 75/244; 75/249
[58] Field of Search ............... 501/96, 93, 87; 264/65; 75/238, 244, 249

[56] References Cited

U.S. PATENT DOCUMENTS

| 2,973,247 | 2/1961 | Espenschied | 23/204 |
| 3,003,885 | 10/1961 | Mandorf | 501/96 |
| 3,316,062 | 4/1967 | Cricione et al. | 423/297 |
| 3,379,647 | 4/1968 | Smudski | 252/301.1 |
| 3,749,571 | 7/1973 | Stibbs et al. | 75/204 |
| 4,008,183 | 2/1977 | Ishii et al. | 75/244 |
| 4,108,670 | 8/1978 | Steiger et al. | 106/40 |
| 4,275,026 | 6/1981 | Hazel et al. | 264/67 |
| 4,486,544 | 12/1984 | De Pous et al. | 264/66 |
| 4,492,764 | 1/1985 | Watanabe et al. | 501/87 |
| 4,500,643 | 2/1985 | Gesing et al. | 501/96 |
| 4,514,268 | 4/1985 | De Angelis | 501/96 |
| 4,592,882 | 6/1986 | Parrish | 264/66 |

FOREIGN PATENT DOCUMENTS

| 57-38658 | 8/1982 | Japan | 75/244 |
| 1004585 | 9/1965 | United Kingdom . | |

Primary Examiner—William R. Dixon, Jr.
Assistant Examiner—Steven Capella
Attorney, Agent, or Firm—John J. Freer

[57] ABSTRACT

The invention relates to the production of desirably consolidated high purity refractory metal borides, carbides, nitrides, or mixtures, combinations of cermets thereof. In the preparation, a second stage reaction is conducted at reduced pressure and sintering temperature. Furthermore, it is carried out in the presence of sintering aid which can be initially present as a particulate material and, as such, may be incorporated with other reaction ingredients. Sintering aid, in a dual role, may serve not only as an assistant in the second stage reaction, but also as a reaction participant. Moreover, during such rection at sintering conditions, the sintering assistance is obtained by means of sintering aid vapor. High purity products of desirable microstructure can be achieved, having densities on the order of 90 percent or more.

6 Claims, No Drawings

PREPARATION AND SINTERING OF REFRACTORY METAL BORIDES, CARBIDES AND NITRIDES OF HIGH PURITY

CROSS-REFERENCE TO RELATED APPLICATION

This application is a continuation-in-part of U.S. patent application Ser. No. 625,599 filed June 28, 1984 now abandoned.

BACKGROUND OF THE INVENTION

The refractory metal borides, carbides and nitrides have already been proposed for use as components of electrolytic aluminum production cells, particularly those components which in use may normally be contacted with molten aluminum and/or cryolite, such as an electrowinning cathode or cathode current feeder. Borides and in particular titanium diboride are often preferred on account of their excellent wettability by molten aluminum and good electronic conductivity. However, many problems have been encountered in producing these materials with a sufficient resistance to attack by molten aluminum and by the conventional alumina-containing cryolite based melts used in aluminum electrowinning cells.

Considering for the moment the production of borides, this may be accomplished by the reduction of a metal oxide or some other metal compound, such as by using carbon, boron or boron carbide. Regarding the use in the reduction of compounds other than metal oxide, it has been disclosed in U.S. Pat. No. 2,973,247 that the titanium component can be in the form of a titanic acid hydrolysate, sometimes known as basic titanium sulfate or basic titanium chloride. More recently, it has been disclosed in U.S. Pat. No. 3,379,647 that solutions of ingredients are desirable. For example, finely divided titanium dioxide can be combined with sucrose and boric acid in an ethylene glycol medium to form an intimate mixture for subsequent heating.

Continuing in the context of the preparation of diborides, it has been shown that the heating of some diborides under vacuum and at substantially elevated temperature will lead to boron loss. It has nevertheless been often taught to prepare diboride with either stoichiometric amounts, or slight excesses of boride reactant. Thus, in the above mentioned U.S. Pat. No. 2,973,247 it has been taught that typically 10% excess of boric acid can be expected to be sufficient for use in the carbothermic reduction of titanium hydrate with an oxidic compound of boron. U.S. Pat. No. 3,379,647 has disclosed that the appropriate quantities of reactants can be calculated quite closely from known equations for the production of the desired product.

On the other hand, some teachings away from stoichiometry have been suggested. In British Pat. No. 1,004,585 it is disclosed that boric oxide may be tolerated in an excess up to 50 percent by weight when considered for reaction with titanium dioxide. It is further disclosed therein that whereas low production temperature may be desirable, as a practical matter more elevated temperatures are actually employed.

However, the outcome of all of the foregoing taken with the conventional sintering approach of these patents has been found to provide products, which when formed into articles by pressing and sintering, are nevertheless prone to severe grain boundary corrosion when exposed, for example, to molten aluminum.

It is to be understood that there are other, well recognized methods of preparing the desired final product, e g., fused salt electrolysis, reductions by other metals, or the vapor phase reaction of the metal halide. However, such reaction methods are not the subject of the present invention.

SUMMARY OF THE INVENTION

It is has now been found that highly pure and desirably consolidated compounds can be produced by taking advantage, with careful attention to detail, of the metal oxide reduction method of preparing the refractory metal substances. In such method, it is preferred that a precursor be formed in a first reaction stage. Often, reactants may then be adjusted before sintering, such as to facilitate the elimination of gaseous reaction by-products. Then in a second step reaction sintering, sintering assistance is obtained via the vapor phase and in cooperation with reduced pressure operation. Products of desirable microstructure can be achieved, for example having densities on the order of 80 to 95 percent and being free from deleterious contamination of the grain boundaries or precipitation of undesired phases. Moreover, products of excellent resistance to grain boundary contamination, and thus of dramatically reduced grain boundary corrosion are achieved.

In brief then, the invention is directed to the method of preparing a consolidated and purified Group IVb, Vb or VIb refractory metal boride, carbide, nitride, or mixture, combination or cermets thereof by means of aided, reduced pressure and elevated temperature operation. The method comprises establishing a composition for second step reaction sintering, with the composition being adapted for enhanced production of desired product, and also providing sintering aid for aiding via the vapor phase in the second step reaction sintering at reduced pressure. The method of the invention also calls for reducing the pressure around the composition, heating said composition at a temperature for sintering while thereby establishing sintering aid atmosphere in contact with the composition, and maintaining the heating for a time sufficient to consolidate the composition, and thereby prepare a consolidated and purified product.

In one most important aspect, the invention is directed to second step reaction sintering in the presence of boron nitride sintering aid. In other aspects, the boron nitride can be in particulate form, and may be thereafter compacted with the reaction mass.

As corollary aspects to the invention, it is further concerned with impact resistant articles, as well as components for an electrolyte aluminum production cell, plus the preparation of refractory metal articles of enhanced consolidation and purity. In a yet further aspect, the present invention is directed to the production of molten metal in an electrolytic cell by molten salt eletrolyisis, in which the electrowon metal is in contact with a component of a cermet produced by a method as described herein and in which the cermet contains the refractory metal boride together with a metal phase that is the same as the electrowon metal.

DESCRIPTION OF THE PREFERRED EMBODIMENTS

The refractory articles produced are the refractory metal borides, carbides, nitrides and mixtures, combinations and cermets thereof. These are most typically the borides, carbides and nitrides of the Group IVb metals titanium, zirconium and hafnium, Group Vb metals vanadium, niobium and tantalum, and VIb metals chromium, molybdenum and tungsten. Mixtures and combinations include physical mixtures, e.g., physical mixtures of titanium and zirconium boride, or mixtures produced in two discrete phases such as the simultaneous production of a boride and a nitride or titanium boride plus titanium carbide. Moreover such mixtures and combinations can include the production of single complex phases, e.g., a borocarbide or boronitride. Furthermore such mixtures can include composites such as $TiB_2/AlN$. The cermets can be formed by preparing porous composite bodies of the refractory articles and then infiltrating them with other metals or alloys.

In the production of these refractory metal compounds there can be used the metal oxide reduction method. Generally, this method involves the reduction of the metal oxide, or some other suitable metal compound, e.g., the sulfide. For example it has been taught in U.S. Pat. No. 2,973,247 that titanium diboride can be successfully produced using a titanic acid hydrolysate, which can be referred to as basic titanium sulfate or basic titanium chloride. Referring still to titanium, typical reaction schemes can include the reaction of the dioxide with carbon to produce titanium carbide, or the reaction of the dioxide with carbon and nitrogen to produce titanium nitride. Both reactions produce by-product carbon monoxide. For purposes of convenience, the "reactant" for combination with the refractory metal, as the term is used herein, is meant the substance reacted with such metal in the desired product, e.g., boride reactant to prepare titanium boride.

Before proceeding with a detailed discussion, certain terms as used herein will be briefly mentioned. A "precursor material" is a starting material formed from initial reaction substituents. The precursor material can then proceed through a two stage process. The first stage is referred to for convenience as a "first reaction step". This step provides incomplete reaction and is carried out at elevated temperature, but always at substantially less than normal sintering temperature. After this, the incompletely reacted materials are processed through a more elevated temperature second stage reaction step. In this second step, unreacted substituents are permitted to react to prepare desired product. It is therefore a more substantive step than the mere removal of product impurities, which may or may not require some reaction. Because of this reaction to produce desired product, and since this second step is carried on at more elevated temperature, it will be referred to herein for convenience as the "second step reaction sintering", or more simply as the "second step".

It will thus be understood that this is not the usual sintering of ceramic materials into a monolithic body, but rather an actual reaction step to a desired, sintered product. As will also be understood by those skilled in the art, the first reaction step may be combined with the second step reaction sintering in an actual, single-stage elevated temperature operation. Such optional procedure will be more fully discussed hereinbelow.

Returning now to the more detailed discussion, such is herein initiated with a description of the precursor material and its formation. It is important that in the reduction method employed the initial combination of reactants can be used to prepare a precursor material. By use of this term there is meant the preparation of a dried cake or the like, such as an amorphous, glassy material. The material should be pulverulent or friable. Such precursor materials are usually prepared simply by low temperature drying, generally on the order of a few hundred degrees centigrade. Various techniques can be used for preparing suitable precursor material, but some precautions may need to be exercised, e.g., adjustments in the proportions of reactants, as discussed more fully hereinbelow. Exemplary such materials have been heretofore disclosed in U.S. Pat. No. 2,973,247 for the preparation of titanium diboride, and U.S. Pat. No. 3,379,647 for the preparation of a variety of materials including molybdenum boride, zirconium diboride, and titanium diboride as well as in co-pending application Ser. No. 454,718 now U.S. Pat. No. 4,595,545 teaching the preparation of amorphous, glass-like precursor materials.

The precursor materials can be readily analyzed for proportions of constituents. Since several moles of carbon, on the order of 2 to 5 moles being not unusual, are often the stoichiometric requirements for reaction with the refractory oxide or the like, it has been known to add carbon to the precursor material following such analysis and before subsequent treatment. It is advantageous for efficient production of purified product that the reactant for combination with the refractory metal be present in an amount at least about 25 weight percent, and preferably from about 50 to about 100 weight percent, in excess over stoichiometric. Thus, in a specific case such as for titanium diboride, stoichiometric requirements would call for 2 moles of boron for one mole of titanium, which will be typically found upon analysis of the precursor material. It is thus advantageous to adjust the molar ratio for the material to contain 2.5 moles of boron per mole of titanium and preferably to have more than a 50 percent molar excess, e.g., a molar ratio of boron to titanium of from greater than 3:1 to 4:1. Adjustments, such as the advantageous molar ratio adjustment, can therefore eventually lead to a composition for second step reaction sintering that will provide enhanced production of desired product.

As mentioned hereinabove, it is also desired for most efficient and economical reaction that further materials for subsequent reaction likewise be present in excess, e.g., excess carbon for carrying forward a carbothermic reduction. This excess above stoichiometric requirements is necessarily only a slight excess. Considering then the case of the carbothermic preparation of titanium diboride, where stoichiometry calls for 5 moles of carbon per mole of titanium, it is advantageous that from about 5.05 to about 5.25 moles of carbon be present in the adjusted material. As mentioned hereinbefore with respect to molar ratio adjustment, this stoichiometry adjustment will likewise serve to eventually provide composition for second step reaction sintering, which composition is adapted for enhanced production of desired product.

For adjusting the precursor, it is desirable for most economical operation that inorganic substances be used. Thus for boosting carbon content of the material, an extremely finely divided carbon powder can be useful. Boric acid can serve where boron addition is required. It is however, contemplated that organic materials, e.g., sucrose and ethylene glycol will be suitable for adjusting the precursor material.

It is to be understood that other ingredients may be added at this juncture of the preparation method. For example, in a subsequent aluminothermic or carboaluminothermic reaction it would be typical to add aluminum or aluminum containing compound to the precursor material. The addition of all such materials can be made by any method known to those skilled in the art suitable for preparing well blended mixtures of ingredients. This can include addition of substances dissolved or suspended in solvents and the solvents can be made fugitive during the blending operation. It is furthermore contemplated that binders might be useful and ingredient additions can be accomplished by being included in such binder materials. For use as binders those materials known in the art are suitable such as the usual waxes and organic liquids. The binder itself may be dissolved in a solvent to assist in preparing a uniform dispersion of ingredients. The solvent can be volatilized during mixing operation or during pressing where materials are compacted by pressing into desirable shapes.

After the adjustments and typically a blending operation, the resulting mixture is then generally pressed which may be by roller pressing or dry pressing in a mold or isostatic pressing, or cold pressing and heating or hot pressing. This produces a body of the mixture for further reaction by heating. Other operations, e.g., machining or drilling of the resultant shaped product may be employed before heating.

At this stage of the process, when the powder is pressed into a shaped article, the presence of a binder is optional. A typical pressure for the pressing can be within the range of from about 20 KPSI to about 40 KPSI. After pressing the material is ready for heating. This heating step is the "first reaction step", which term has been mentioned hereinbefore. In this step, the material is generally first heated for a brief time at a reduced temperature, for example from about 200°-400° C., to evacuate trapped gasses. When the process is a carbothermic reduction, it will be typical before heating to first load the article in a carbon or graphite crucible. Even during the initial low temperature heating, it is preferred that this first reaction step process proceed under reduced pressure to facilitate evacuation of trapped gasses. Low pressure is maintained as heating continues such that the step is carried out at a vacuum within the range of from about 1 millitorr to about 5,000 millitorrs, and more typically, for efficient evacuation of gas coupled with economy of operation, at a reduced pressure within the range from on the order of about 50 millitorrs to about 1,000 millitorrs.

As this first reaction step is continued, the temperature is increased but is always maintained substantially less than normal sintering temperature. In the specific case for the production of a compound such as titanium diboride, the brief, initial heating at a reduced temperature can be followed by a relatively fast temperature increase to about 1100° C. The heating rate may be reduced such that the shaped article is heated in this first reaction step to a temperature maximum within the range of from about 1100° C. to about 1400° C. For comparison, a usual temperature for initiating the reaction for such titanium diboride can be expected to be on the order of about 1500° C. or more. At the upper, attained temperature level in this first reaction step, the shaped articles are allowed to remain at temperature for a time period sufficient to complete at least substantial reaction. It is advantageous for economy of operation that this reaction proceed to greater than 50% of completion, but it will not reach 100%, preferably falling somewhat short such as to 95% or more. Subsequently, the reaction will reach completion during the second step reaction sintering. The use of temperatures well below normal sintering temperature will help assure that complete reaction is not achieved. For a product where off-gasses will be produced as reaction progresses, the progress of the reaction can be monitored by plotting temperature and pressure against time. Thus, when it is observed that the pressure begins to substantially decrease, a clear indication is signaled that the reaction is approaching completion. The heating can be maintained for a while longer or terminated to end this first reaction step and the product permitted to cool.

If the resulting material crumbles easily, it need not be comminuted, otherwise such operation is generally in order. Since sintering has not as yet occurred, constituent additions can now be made to the product, as will be discussed more particularly hereinbelow, e.g., in connection with the examples. These adjustments can provide a composition for second step reaction sintering that will provide enhanced production of desired product. If it is deemed that no additions are in order, the pulverulent product may then be pressed. For this pressing, a binder such as camphor or paraffin wax can be advantageous to insure structural integrity of the shaped article during the subsequent second step reaction sintering. The shaped article can be machined to obtain desired shape or geometry. For example, holes may be drilled into the article to obtain a honeycomb structure.

The second step reaction sintering then proceeds under reduced pressure and at sintering temperature, with an established sintering aid atmosphere, i.e., in an aided condition. When such features of the invention are combined with other aspects of preparing the final product, e.g., the constituent adjustments as discussed hereinbefore for providing enhanced production of desired product, the product achieved will be highly pure, it will be economically produced and it will exhibit desirable consolidation. The establishing of a sintering aid atmosphere is sometimes referred to herein for convenience as "controlled atmosphere sintering". By this it is meant that the atmosphere around the shaped article during the second step contains sintering aid ingredient in the vapor phase. Controlled atmosphere sintering can permit the production of consolidated refractory metal material in the second step without deleterious incorporation in the product of a second phase.

To produce the appropriate atmosphere of activating agent, or "sintering aid", such may be provided by addition of materials directly or by reaction. For convenience the term "activating agent" has been used herein to denote an agent that either acts via the vapor phase to assist in controlled atmosphere sintering, or cooperates with other such agents to aid in controlled atmosphere sintering. In the particular case of preparing titanium diboride by carbothermic reaction, boron carbide is known to assist sintering when in mixture with the material being sintered. The boron carbide is a solid at normal temperatures and pressure, i.e., at 20° C. and atmospheric pressure. But for the present invention, boron nitride is of especial interest for use as a sintering aid. The boron nitride may be present as a particulate material, and in such form it can be incorporated with other reaction ingredients. Thus it can be pressed with such ingredients into a compact for controlled atmosphere sintering. Or it can be serviceable when present adjacent the compact, e.g., as a support for the compact to rest upon or as a loose particulate, or both. Boron nitride in a dual role may serve not only as an assistant in second step reaction sintering, but also as a reaction participant, as in the preparation of composites, such as those combining aluminum nitride with refractory metal compounds, as will be discussed further hereinbelow.

At even the reduced pressure of the second step reaction sintering the boron carbide or boron nitride when present, such as adjacent the compact as a loose particulate, will have a finite vapor pressure that will establish the requisite sintering aid atmosphere. It is thus preferred that the sintering aid be present in particulate form, either solely in such form or in combination, such as with a compact of sintering aid serving as a support, as well as around the material for second step heating in the most preferred form. It is however, only necessary to provide a partial pressure of sintering aid to achieve controlled atmosphere sintering during the second step. Such partial pressure can be provided, for example, by the addition of boron carbide compound during the second step, or it might be supplied by reaction. For employing both boron nitride and boron carbide, a graphite furnace might be used with boron nitride supplied with the product, whereby boron carbide atmosphere will be formed during the second step. Or, these sintering aids can be present outside the sintering zone, e.g., formed by reaction outside such zone, and introduced to such zone and thereby to the shaped article for controlled atmosphere sintering. For the preparation of an exemplary titanium diboride product, other materials useful for establishing this sintering aid atmosphere by reaction could be elemental boron, active carbon, or carbonitrides of titanium, as examples of other sources for boron and carbon vapors.

Such activating agents will enhance consolidation of the product during controlled atmosphere sintering. This consolidation might be accompanied by product shrinkage, i.e., densification. In addition to controlling of the atmosphere to provide a sintering agent atmosphere, the operation should proceed so as to remove substituents such as reaction by-products. Thus, in the carbothermic preparation of titanium diboride, carbon monoxide is a necessary by-product. The reaction is carried out so that this by-product is readily removed.

To achieve the second step reaction sintering, the heating will be initiated gradually, especially where binder has been used, to accommodate binder burnoff. When this has been accomplished, and as heating is continued under reduced pressure, a quite rapid temperature increase can be permitted. Thus in the case of the preparation of titanium diboride, the shaped article might be heated from a temperature of about 500° C. to over 2000° C. in a time of from as short as about 0.5 hour to as long as about 2 hours. Continuing with this specific embodiment, such titanium diboride can then be maintained at a second step temperature, generally within the range of from 2000° C. to not above about 2300° C. For added economy, it is more advantageously maintained at a temperature within the range of from about 2000° C. to about 2100° C., for a time of from about 1 hour to about 4 hours. Second step reaction sintering times of less than about 1 hour for the particular titanium diboride can result in insufficient consolidation. If second step times exceed more than about 4 hours unwanted contaminants from surrounding materials may be aggregated with the desired product.

It will be appreciated from the foregoing that it is important to the invention to maintain careful control over characteristics pertaining to the microstructure of the resulting product. Initially, stoichiometric excesses of materials can be important to adapt the formation of the precursor powder for enhanced production of desired product, as has been discussed hereinbefore. Furthermore, second step reaction sintering assistance is necessary, and obtained via the vapor phase. Moreover, sintering time should be curtailed to avoid contaminant aggregation with the desired product. This attention to these and other parameters in the formation of the product will assist in providing a desirable degree of densification, i.e , a control over the porosity, of the final product. As an exemplification, titanium diboride desired product, although serviceable such material can be produced having a density of on the order of 55 percent, material of as great a density as 80-95 percent, theoretical basis, can be obtained.

At the end of the second step, the resulting desired product is permitted to cool and can then be separated from any adhering materials, e.g., a surrounding pulverulent sintering aid material. Such material can generally be removed from the product either by surface grinding or brushing. Where the above-discussed critical parameters have been carefully considered, i.e., those that are useful for control over the product microstructure, a most desirably consolidated, purified product will be achieved. It should be understood that where the desired product can solubilize other ingredients, particularly reaction by-products, which are present during the second step, some amount of such ingredients may be found solubilized in the product. Yet such product will fall within the meaning of purified product for purposes of this invention. What is a foremost objective of the present invention is reduction to elimination of grain boundary contamination of unwanted constituents. As in the case of titanium diboride, an oxygen impurity level of on the order of about 500 ppm, which level is considered quite high for purposes of the present invention, will nevertheless be virtually all dissolved within the diboride so that deleterious grain boundary segregation of oxygen is minimal. Furthermore, small amounts of carbon can typically be found uniformly distributed in the titanium diboride matrix. Such carbon level will generally be below 2000 ppm and can be as low as 500 ppm or even less. Such amounts will not lead to grain boundary segregation of carbon.

The foregoing discussion on heating has been presented as a two-step procedure, going through a first reaction step and then to a second step reaction sintering. This is the preferred procedure for purposes of flexibility in adjusting reactants and to provide enhanced production of desired product, e.g., produce the most pure, consolidated material. It is, however, to be understood that a one-step heating procedure may be used. In general, the above-discussed first reaction step would be employed, and from there the process would proceed directly to the more elevated temperature second step, but being careful that the other second step features, such as reduced pressure and sintering aid atmosphere, are utilized.

It is also to be understood that in the two-step heating sequence, the precursor powder, before the first reaction step, may be blended with additional reactants or substances and then further heat processed. Thus, in the specific case of obtaining a $TiB_2/AlN$ composite, in one procedure the AlN can be admixed with the precursor powder prior to the first reaction step. Alternatively in another procedure, boron nitride and metallic aluminum can be added separately, to form the metallic aluminum nitride in situ; or a combination of these two procedures may be employed.

It is also to be understood that alternatives to the carbothermic preparation of the precursor powder may be serviceable. One alternate procedure is a carboaluminothermic production of a precursor powder. In the case of reducing titanium and boron oxides, this route could be employed for preparing $TiB_2/AlN$ composite. Or, as mentioned hereinbefore, such material can be prepared where the precursor powder is derived from carbothermic reduction alone and then the material is obtained by direct addition of aluminum nitride to the powder or by in situ reaction between boron nitride and aluminum.

More particularly, ingredients for preparing a composite can be mixed together before second step reaction sintering and pressed into a shaped article, typically using a binder. The pressed article is then generally brought up to second step temperature in a manner such as described hereinbefore, preferably under an argon atmosphere as with the situation of preparing $TiB_2/AlN$ to prevent loss of aluminum nitride. For second step reaction sintering the $TiB_2/AlN$ composite, a temperature within the range of from about 1800° C. to about 2100° C., maintained for a time of about 2 hours to about 8 hours, will be useful. The resulting shaped article is then allowed to cool and treated as described hereinabove. This specific composite is particularly useful in an aluminum electrowinning process for its known resistance to both aluminum and cryolite.

The following examples show ways in which the invention has been practiced but should not be construed as limiting the invention.

EXAMPLE 1

As more fully described in Example 1 of co-pending U.S. Pat. application Ser. No. 454,718, now U.S. Pat. No. 4,595,545 a solution was prepared of titanium butoxide and trimethyl borate with a B:Ti molar ratio of 2:1 A sugar solution was added to provide a carbon equivalent of five times the amount of titanium. Addition of the solution gave titanium and boron oxides in a hydrated gel form. The product was then heated at 60°-70° C. to remove water and alcohols. Subsequently, it was heated in an inert atmosphere at 200° C. for about 16 hours and at 400° C. for about 8 hours.

The product was then analyzed, e.g , by inductively coupled plasma technique and neutron activation, and found to have molar ratios of B:Ti=1.51:1, C:Ti of 4.18:1 and O;C=0.75:1. The product was lightly ground and mixed with boric acid, Shawinigan carbon black and ethylene glycol such that the B:Ti and C:Ti ratios (molar) were 3:1 and 5.05:1 respectively and the amount of ethylene glycol was approximately one third the amount of boric acid. The reactants were blended together and heated to 180° C. for 16 hours in air. Upon cooling, a powder was obtained by light grinding. Analysis of the powder obtained after this treatment gave B:Ti and C:Ti molar ratios equal to 2.8:1 and 5.38:1, respectively.

The powder was then isostatically pressed at about 30 KPSI into pellets that were placed in clean carbon crucibles. The pellets were then heated in a vacuum furnace initially at low temperatures in the range of 100°-300° C. until gas evolution subsided, then they were heated to 1100° C. for about 2 hours followed by slow heating from 1100° C. to 1400° C. in eight hours. Initiation of reaction was observed by gas evolution inducing an increase in the reduced pressure when the temperature was in the range of 1100°-1150° C. After reaching 1400° C., arrival toward completion of the reaction was marked by a sudden drop in pressure in about 2-4 hours. However, to ensure a more fulfilling reaction for this stage of the process, the temperature was maintained for 8 hours after which the furnace was allowed to cool down. Generally, pressure was kept below 1000 millitorrs. After the reaction, the pellets were found to have crumbled into a light gray powdery mass. The powder did not need further grinding. X-ray diffraction analysis indicated $TiB_2$ as the only crystalline phase. The particles showed well defined plates of $TiB_2$ with the plate dimensions in the range of 1-5 microns in length and about 0.1-0.5 micron in thickness.

The powder was then pressed into a pellet by first mixing with a 4 weight percent dispersion of Carbowax 200 (Union Carbide) dissolved in methylene chloride and then pressing the resulting mixture at a pressure of about 30 KPSI. The pellet was surrounded by boron carbide powder and placed in a carbon crucible covered with a lid. This assembly ensured that the atmosphere could be controlled around the pellet for second step reaction sintering. The pellet was heated in a temperature range of 100°-300° C. to remove binder and then heated to about 2100° C. in about 1.5 hours. After reaching that temperature, it was maintained for two hours after which the furnace was allowed to cool. Pressure was maintained at less than 1000 millitorr. The pellet thus prepared had shiny metallic luster. Elemental analysis showed that carbon was less than 100 ppm and oxygen was about 270 ppm. Trace metal analysis did not show any significant amount of impurities. Typically, they were less than 500 ppm. The thickness of the pellet showed shrinkage of about 11 percent by volume. Near the surface the pellet showed very high density while in the interior it was somewhat porous. The grain size was in the range of 5-40 microns.

A part of the pellet was immersed in molten aluminum at 1000° C. for 10 hours and then 100 hours. The pellet showed excellent wetting by aluminum and negligible corrosion.

EXAMPLE 2

As discussed in Example 1, a solution was prepared of titanium butoxide and trimethyl borate with a B:Ti molar ratio of 2:1. The solution was hydrolyzed using a sugar solution such that the molar ratio of carbon equivalent to titanium was 5:1. After hydrolysis the powder was dried and heated at 200° C. and then 400° C. in a manner described in Example 1. Analysis of the powder gave molar ratios of B:Ti=1.593:1, C:Ti=4.427:1 and O:Ti=3.169:1. This product was lightly ground and the resulting powder was mixed with boric acid, carbon black (Shawinigan Black) and ethylene glycol such that the B:Ti molar ratio was 4:1 and the C:Ti molar ratio was 5.25:1. Ethylene glycol was added such that its amount was approximately one third the amount of boric acid. The reactants were blended together and heated to 180° C. for 16 hours in air. Analysis of the powder obtained after this treatment gave B:Ti and C:Ti molar ratios equal to 3.91:1 and 6.14:1, respectively. The powder was obtained by light grinding.

The powder was then pressed into pellets in the manner of Example 1 and then placed in clean carbon crucibles. The pellets were then heated in a vacuum furnace at a temperature sequence and under a reduced pressure all as described in Example 1. After the reaction, the pellets were found to have crumbled into a light gray powdery mass. The powder did not need further grinding. X-ray diffraction analysis indicated $TiB_2$ as the only crystalline phase. The particles showed well defined plates of $TiB_2$ with the plate dimensions in the range of 1-5 microns in length and about 0.1-0.5 micron in thickness. The powder was then formed into a pellet and pressed as described in Example 1. The pellet was surrounded by boron carbide powder and placed in a carbon crucible covered with a lid. This assembly ensured that during heating the boron carbide vapor that would be produced by such elevated temperature heating would be trapped within the crucible and therefor be present within the vicinity of the pellet during second step reaction sintering. The pellet was heated at elevated temperature and under reduced pressure all as described in Example 1.

The pellet thus prepared had a shiny metallic luster. Elemental analysis showed that the material was pure $TiB_2$ with trace impurities such as carbon at about 240 ppm and oxygen at about 420 ppm. Trace metal analysis did not show any significant amount of impurities. Typically they were less than 500 ppm. The thickness of the pellet showed shrinkage of about 20% by volume. The density of the pellet as judged by optical comparison method was about 85-90% of the theoretical density. The grain size was in the range of 1-5 microns. A part of the pellet was tested in the manner of Example 1. By means of such testing, the pellet showed excellent wetting by aluminum and negligible corrosion.

EXAMPLE 3

By way of comparing sintering aid materials, as well as comparing operating procedures with the foregoing examples, and also by way of illustrating composite preparation, the following tests are reported.

As more fully described in Example 1, a solution was prepared of titanium butoxide and trimethyl borate with a B:Ti molar ratio of 2:1. A sugar solution was added to provide a carbon equivalent of five times the amount of titanium. Addition of the solution gave titanium and boron oxides in a hydrated gel form. The product was then heated at 60°-70° C. to remove water and alcohols. Subsequently, it was subjected to the same treatment, including the same thermal treatment, as in Example 1. Thus, it was heated in an inert atmosphere at 200° C. for about 16 hours and at 400° C. for about 8 hours and then, following pressing, to a temperature up to 1400° C.

The product was then analyzed by inductively coupled plasma technique and found to contain 70.2 weight percent $TiB_2$ and a balance of $Ti_2O_3$. Fifty grams of the product were mixed with 6.645 grams of $B_4C$ and 6.6 grams of Shawinigan carbon black. The mixture contained a 5 weight percent excess of the $B_4C$ over the amount required for reaction with the $Ti_2O_3$. The mixture was blended with a binder that was a 4 weight percent dispersion of Carbowax 200 dissolved in methylene chloride. This mixture was isostatically pressed at about 10 KPSI into a pellet.

By way of comparison, without use of either the preferred sintering aid or the technique of using surrounding sintering aid particulate, the pellet was heated in a vacuum furnace in a carbon crucible using a $B_4C$ support. The heating was initially at low temperature until gas evolution subsided, and then the pellet was heated to 2100° C. for 4 hours. Generally, pressure was kept below 1000 millitorrs. After this vacuum heating the material produced by the comparative test was found to have an about 30-40% porosity. The grain size of the $TiB_2$ was in the range of from about 0.5 to 3 microns.

For comparison, the test was repeated, but using the preferred boron nitride sintering aid. To do this, a BN support was used for the test pellet during the elevated temperature heating. All of the other above discussed procedures remained the same. The resulting sample in this test showed a density in excess of 95 percent. The grain size of the $TiB_2$ was in the range of 15-50 microns. Thus the preferred BN support provided for the more highly desirable product densification.

An additonal amount of the $TiB_2$ precursor powder containing $Ti_2O_3$ was mixed with $B_4C$ and carbon black in the above-described proportions. To this mixture there was added BN plus metallic aluminum. More particularly, the respective weights used were 5.23 grams of $TiB_2:Ti_2O_3$ mixture, 0.389 gram of BN and 0.458 gram of the particulate, metallic aluminum. A test pellet was prepared as described in Example 1 and was fired for 16 hours under reduced pressure in an argon atmosphere, with the last stage attaining a temperature of 2000° C., which was maintained for $4\frac{1}{2}$ hours. A partial pressure of nitrogen was maintained to ensure a minimum loss of AlN. This pellet was found to have areas where the density reached as high as 85 percent. Microstructure analysis showed $TiB_2$ grains with AlN in the pores or at the grain boundaries. A resultant test piece was immersed in molten aluminum at 1000° C. for 100 hours and showed excellent wetting by the aluminum.

What is claimed is:

1. The method of preparing a consolidated and purified Group IVb, Vb or VIb refractory metal boride, carbide, nitride, or mixture, combination or cermet thereof by means of aided, reduced pressure and elevated temperature conditions, which method comprises:
    (a) establishing a composition for a second stage reaction step of reaction sintering and adapted for enhanced production of desired product;
    (b) providing sintering aid at least in part together with said composition and resting said composition upon said sintering aid, which aid is solid at normal pressure and temperatures and aids via the vapor phase at the pressure and temperature conditions of the second stage reaction step;
    (c) reducing the pressure around said composition;
    (d) heating said composition at a temperature for sintering; while
    (e) establishing sintering aid atmosphere in contact with said composition; and
    (f) maintaining the heating for a time sufficient to consolidate said composition, and thereby prepare a consolidate and purified product.

2. In the method of preparing a Group IVb, Vb or Vib refractory metal boride, carbide, nitride, or mixture, combination or cermet thereof by a second stage reaction step of reaction sintering, the improvement comprising conducting said second stage reaction step in the presence of boron nitride sintering aid, including resting sintering composition upon said boron nitride.

3. In the method of preparing a Group IVb, Vb or Vib refractory metal boride, carbide, nitride, or mixture, combination or cermet thereof by a second stage reaction step of reaction sintering, the improvement comprising conducting said second stage reaction step in the presence of boron nitride sintering aid provided as a loose particulate together with composition for the second stage reaction step.

4. The method of preparing a second stage reaction step sintered composite of aluminum nitride and a Group IV, Vb or VIb refractory metal boride or carbide from a precursor composition of refractory metal boride or carbide prepared from a second stage reaction step, which method comprises:
  (a) mixing together said precursor, particulate metallic aluminum and particulate boron nitride;
  (b) compacting the resulting mixture;
  (c) introducing the compact to a heating zone having an inert-gas-containing atmosphere;
  (d) heating the compact;
  (e) establishing during said heating a partial pressure of boron nitride vapor in said heating zone; while
  (f) maintaining in said heating zone a partial pressure of nitrogen for reaction with said particulate aluminum; and
  (g) maintaining the heating for a time sufficient to prepare the second stage reaction step sintered composite.

5. The method of preparing a consolidated and purified Group IVb, Vb or VIb refractory metal boride, carbide, nitride, or mixture, combination or cermet thereof by means of aided, reduced pressure and elevated temperature conditions, which method comprises:
  (a) establishing a composition for a second stage reaction step of reaction sintering and adapted for enhanced production of desired product;
  (b) providing sintering aid at least in part together with said composition and as loose particulate around said composition, which aid is solid at normal pressure and temperature and aids via the vapor phase at the pressure and temperature conditions of the second stage reaction step;
  (c) reducing the pressure around said composition;
  (d) heating said composition at a temperature for sintering; while
  (e) establishing sintering aid atmosphere in contact with said composition; and
  (f) maintaining the heating for a time sufficient to consolidate said composition, and thereby prepare a consolidate and purified product.

6. The method of preparing a consolidated and purified Group IVb, Vb or VIb refractory metal boride, carbide, nitride, or mixture, combination or cermet thereof by means of aided, reduced pressure and elevated temperature conditions, which method comprises:
  (a) establishing a composition for a second stage reaction step of reaction sintering and adapted for enhanced production of desired product;
  (b) providing sintering aid for aiding via the vapor phase in the seconnd stage reaction step of reaction sintering at reduced pressure;
  (c) reducing the pressure around said composition;
  (d) heating said composition at a temperature for sintering; while
  (e) establishing sintering aid atmosphere in contact with said composition by at least in part providing said aid in the vapor phase in a zone external to said second stage reaction step and feeding said vapor thereto; and
  (f) maintaining the heating for a time sufficient to consolidate said composition, and thereby prepare a consolidate and purified product.

* * * * *